May 7, 1935.  C. T. HOFFMAN  2,000,022
ICE CREAM FREEZER
Filed July 22, 1931   3 Sheets-Sheet 1

Inventor
Charles T. Hoffman,
By Emory L. Groff
Attorney

May 7, 1935.  C. T. HOFFMAN  2,000,022
ICE CREAM FREEZER
Filed July 22, 1931   3 Sheets-Sheet 2
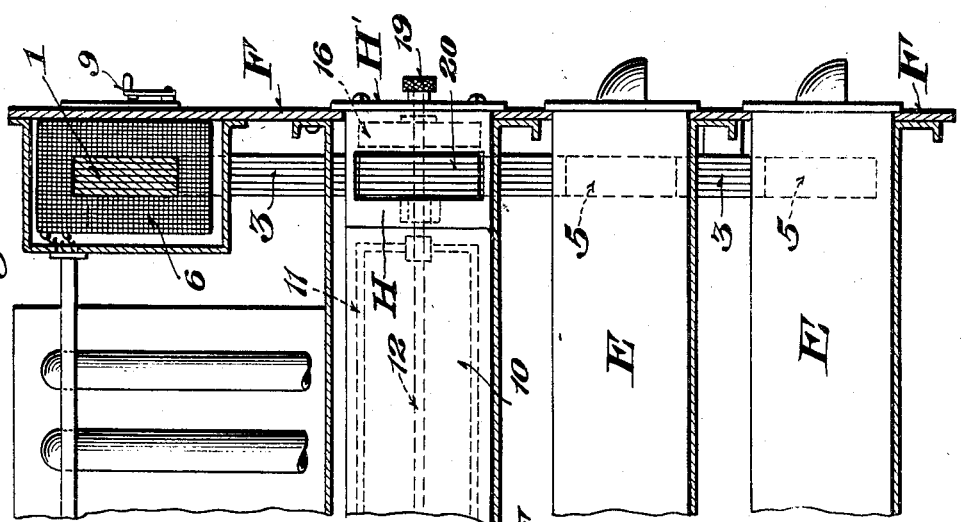
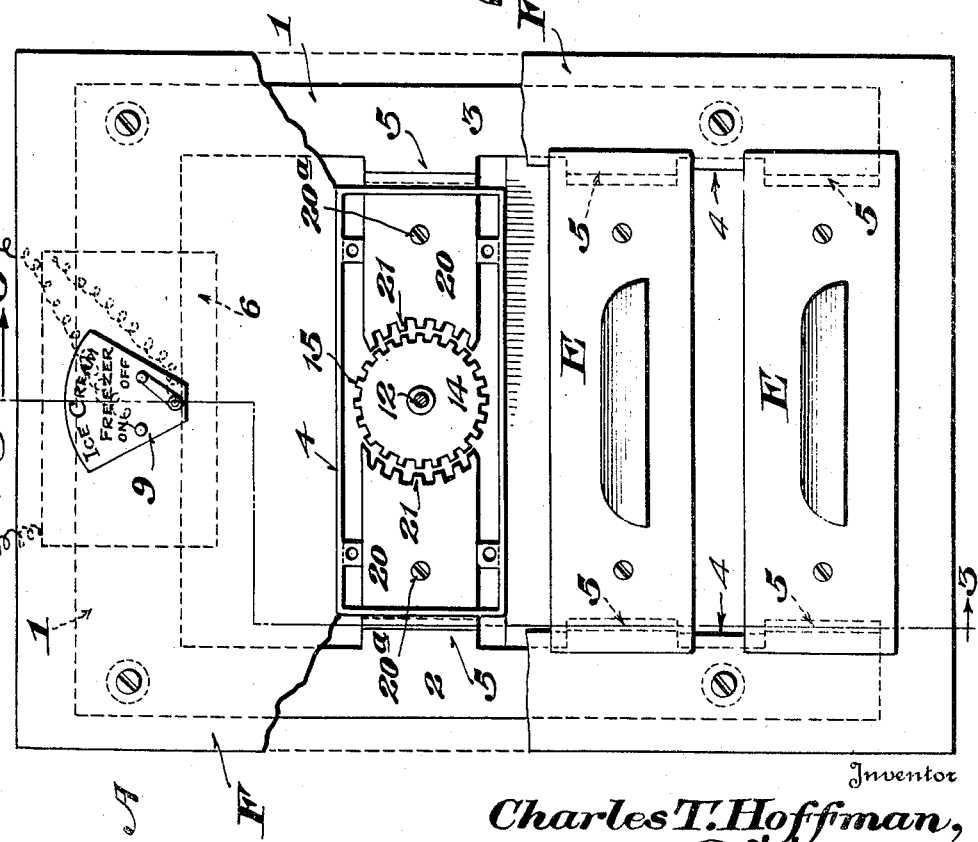
Inventor
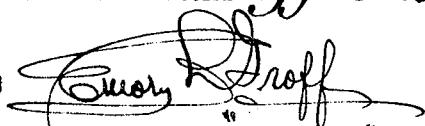

May 7, 1935.   C. T. HOFFMAN   2,000,022
ICE CREAM FREEZER
Filed July 22, 1931   3 Sheets-Sheet 3
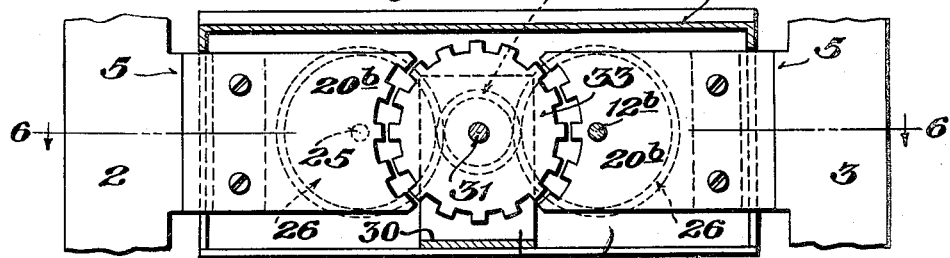
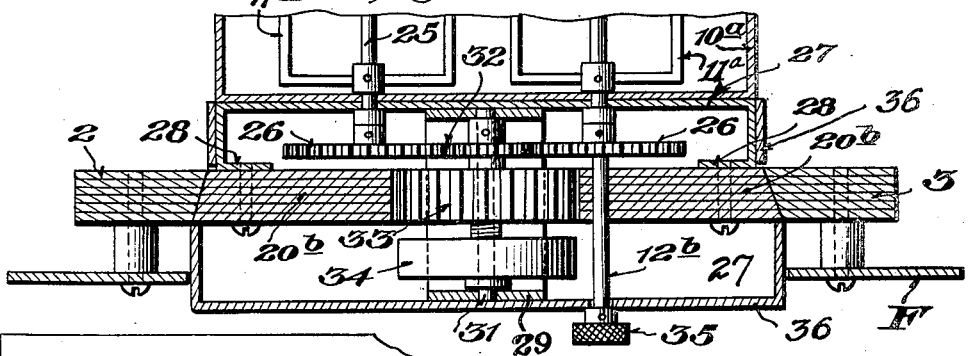
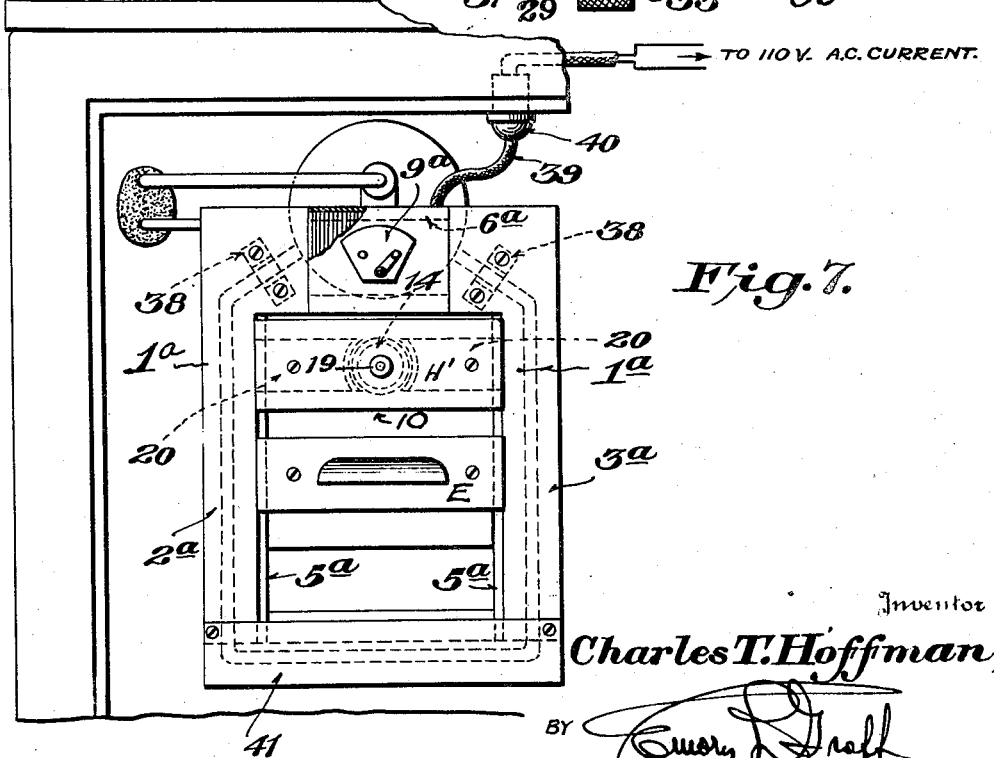

Patented May 7, 1935

2,000,022

UNITED STATES PATENT OFFICE

2,000,022

ICE CREAM FREEZER

Charles Thomas Hoffman, Washington, D. C., assignor, by direct and mesne assignments, to Emory L. Groff, as trustee Application July 22, 1931, Serial No. 552,503

20 Claims. (Cl. 62—116)

This invention relates to ice cream freezers adapted for use with the evaporator or cooling unit of mechanical domestic refrigerators.

Heretofore, ice cream freezers employed for this general purpose have been specially designed, as distinguished from an ice cream freezer which can be used as readily as a standard type ice pan. The present invention has particularly in view an ice cream freezer in the form of a pan which may be readily inserted in the ice cube forming compartments of an evaporator interchangeably with a standard ice pan, and which requires no manual attention other than the placing of the pan into the freezing compartment and removing the same.

Accordingly, one of the objects of the invention is to provide an ice cream freezer simulating the characteristics of a standard ice pan, and including electrically operated dasher means which dispenses with both wiring and mechanical connections between any part of the evaporator or refrigerator and the ice cream freezer, so that the freezer may be merely inserted in the freezing compartment of the evaporator and by the mere act of emplacement becomes ready for operation. In that connection the present invention contemplates the utilization of novel means for electrically operating the dasher through the use of a synchronous motor having a field coil and a divided field core, so arranged as to permit of the ready admission and removal of the freezer without the necessity for the use of the instrumentalities heretofore pointed out.

Another object is to provide an ice cream freezer whose operating means are entirely concealed, particularly with reference to that part of said operating means which are in fixed relation to the refrigerator cabinet and evaporator, thus eliminating cumbersome and inconvenient attachments, and permitting the interior of the refrigerator, whether the cream freezer is or is not in use, to retain the same neat appearance as prior to installation of the freezer.

Another object is to provide means for conveniently turning on and off the electrical current required to operate the dasher.

Another object is to provide means for automatically retaining the freezer in fixed relation to the evaporator, regardless of vibration of the refrigerating apparatus or the opening or closing of the door to the cabinet.

A still further object is to provide means for requiring that the current to the dasher operating apparatus be turned off before the ice cream freezer may be easily removed from the evaporator recess, thus including an automatic warning to the user as to when the current should be switched off.

An object also is to provide an ice cream freezer which is readily adapted to standardization as equipment of electrical refrigerators, including facility of installation, servicing, and the substitution of parts, as well as being adapted to installation as standard equipment for refrigerators on the market and in use not now equipped with ice cream freezers having agitating and stirring means.

A preferred and practical embodiment of the invention is shown in the accompanying drawings, in which:—

Fig. 2 is an enlarged detail view of the front of the evaporator unit illustrating the ice cream freezer inserted in place of one of the standard ice pans.

Fig. 3 is a vertical sectional view taken on the line 3—3 of Fig. 2.

Fig. 5 is a front elevation of the synchronous motor dasher operating unit carried by the front of the freezing pan.

Fig. 6 is a cross sectional view taken on the line 6—6 of Fig. 5.

Fig. 7 is a detail view of a modification of the synchronous motor unit.

Similar reference characters designate corresponding parts throughout the several figures of the drawings.

Figure 1:
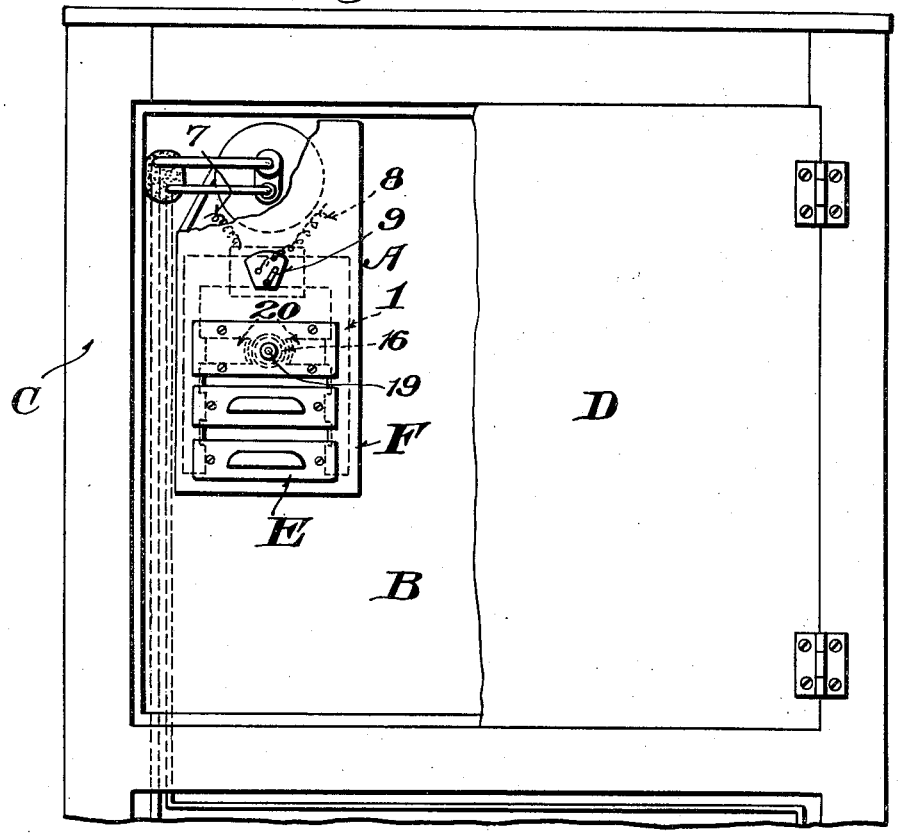
Fig. 1 is a view of a refrigerator illustrating the application of the invention.

Referring first to Fig. 1 of the drawings, the usual evaporator, designated generally as A, is shown as being located in the cooling compartment B of the refrigerator cabinet C having the door D. The evaporator A having the usual freezing compartments and removable ice pans E, is provided with a face plate or cover F, which is usually spaced in front of the coils of the evaporator and serves to conceal them.

According to the present invention it is proposed to mount, in any suitable manner, at the inside face of the plate F an electro-magnet I, the opposite legs or fixed pole pieces 2 and 3 of which extend downwardly at each side of the opening 4 in the face plate and at the location of the freezing compartments may be provided with the inwardly projecting or offset pole pieces 5. The electro-magnet I is, therefore, of the horseshoe type and is provided with a coil 6 suitably connected by the wires 7 and 8 with a source of commercial alternating current, and adapted to be controlled by a suitable switch mechanism 9 mounted on the face plate. This switch mechanism may be of any conventional type, and when the handle thereof is turned to the "on" position current will be supplied to the coil 6 whereby a vibrating magnetic field will be induced throughout the magnet 1. On the other hand, when the switch arm or handle is turned to the "off" position, the current will be cut off from the coil, whereupon the electro-magnet 1 will be dead.

Figure 4:
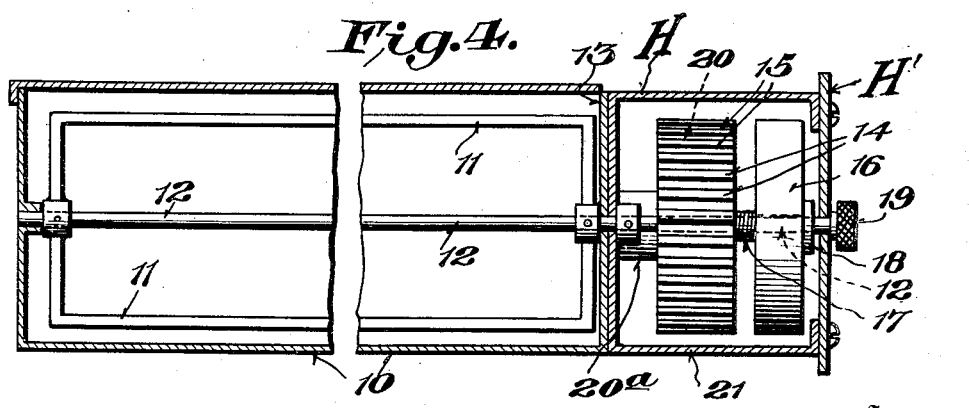
Fig. 4 is a longitudinal sectional view of the ice cream freezer.

The ice cream freezer, as previously indicated, has all of the essential characteristics of the standard ice pan in respect of its handling and its adaptation to the freezing compartments of the evaporator. Accordingly, by reference to Fig. 4 it will be observed that the ice cream freezer is designated generally as 10 and includes a body or pan having therein suitable dasher means 11. In the example shown, the dasher means may consist of the rotary dasher 11, having the shaft 12 which carries the dasher or mixing paddles, and extends through the front wall 13 of the pan to constitute a part of the motor rotor shaft. That is to say, if a single dasher is used, the dasher shaft may also be the rotor shaft where it extends through the front of the pan, the said rotor being a part of a synchronous motor. In Fig. 4 the rotor 14 is shown as the conventional magnetic metal wheel or disc having a toothed periphery, the teeth being designated as 15. The rotor 14 is fixed on the extension of the shaft and has associated therewith the brass or other non-magnetic metal friction and inertia member 16. This member is loosely mounted on the shaft extension and frictionally engages the collar 18 which is fast on the shaft. The spring 17 arranged between the rotor 14 and the member 16 frictionally interlocks the rotor and the inertia member. The end of the shaft 12 is provided with a finger engaging knob 19 for the purpose of launching the rotor at a speed above or approximating synchronism with the 60-cycle alternations or magnetic vibrations induced in the electro-magnet 1 by passing through the coil 6 commercial alternating current, which magnetic vibrations or alternating pulls are imposed on the teeth of the rotor 14 through the pole pieces 20 carried by the housing H of the removable freezing pan. The pole pieces 20 are therefore movable with respect to the pole pieces 2 and 3 and are provided at their inner ends with the usual projections 21 which are of substantially the same spacing as the projections 15 on the rotor, thereby to maintain the rotor in operation when the electro-magnet is energized by alternating current. The pole pieces 20 are mounted on suitable posts 20a carried by the housing H which is attached to the front wall of the pan 13.

The synchronous motor thus comprises a coil 6 wound about the crossbar of a laminated substantially U-shaped core having fixed pole pieces 2 and 3 adapted to contact with pole pieces 20. Pole pieces 20 carry at their inner ends the projections 21 which extend into close propinquity with the periphery of a magnetic rotor 14. The rotor 14 has a plurality of regularly spaced radial projections 15, which are so spaced that a plurality of non-adjacent projections at opposite sides of the rotor may be in substantial registry respectively with the projections 21—21 on the pole pieces 20 at one time.

The housing H is preferably a pressed metal box-like member with slots in its opposite side walls through which the beveled ends of the pole pieces 20 project, as will be apparent from Fig. 3. Also the housing may be provided with a face plate or cover H' to completely house and conceal the rotor and its associated parts.

It is pointed out that the ends of the inwardly projecting portions 5 of the electro-magnet and the outer ends of the pole pieces 20 are reversely beveled as clearly shown in Figs. 2 and 6, so that when the freezing pan is inserted into the freezing compartment the mating bevels will contact thereby to constitute the pole pieces 20 carried by the pan, in effect, an extension of the pole pieces 5, and hence the pole pieces 20 by proximity or contact become fully effective parts of the electro-magnet 1. The purpose of beveling the ends of the pole pieces and the portion of the electro-magnet with which the pole pieces engage is to insure a full contact between the pole pieces carried by the freezing container and the electro-magnet. The electro-magnet being in the cabinet and subject to the cold conditions of the evaporator will be substantially fixed with reference to expansion or contraction. On the other hand, when the ice cream freezing container is first placed in the freezing compartment of the evaporator it will be relatively warm, and as the metal of the pole pieces 20 and their associated parts contract, the electro-magnetic coupling between the pole pieces and the legs of the electro-magnet will draw the pole pieces continuously into self-seating engagement. When the current is turned on in the coil 6 and the legs of the electro-magnet are energized, it will be apparent that the pole pieces carried by the freezing container will be electro-magnetically locked to the legs of the electro-magnet. Thus the freezing container is held in its proper position within the freezing compartment, and cannot be readily removed until the current to the coil 6 is cut off. This will serve as a warning to the user of the freezer that the current should be switched off from the coil before the freezer is removed. While no dangerous condition would result from forcing the freezer out of the freezing compartment when the current is turned on, nevertheless the resistance to withdrawal when the current is turned on will serve as a signal to the user that the current should be cut off at the switch 9 to save the consumption of current.

Figs. 5 and 6 illustrate the use of a double dasher construction. In this form of the invention, the freezing pan 10a is equipped with the double dashers 11a whose shafts 25 extend through the front wall of the pan to receive gears 26 which are a part of the synchronous motor dasher driving means. According to this embodiment of the invention, the synchronous motor unit may include a suitable bracket 27 which may be riveted or otherwise secured to the front wall of the pan, and has the side wall portions thereof inwardly deflected as at 28 to form supports for the pole pieces 20b. The synchronous motor may be mounted on a U-shaped frame or bracket 29 whose bottom portion 30 may be secured to the bottom wall 27a of the main bracket. The synchronous motor mounted in the U-shaped frame 29 consists of the shaft 31 having thereon a pinion 32 for meshing with the dasher gears 26, and also carries thereon the toothed rotor wheel 33 and the friction and inertia disc 34 in the same manner as heretofore described in connection with Figs. 2 and 4. In this construction it is preferred to place the finger knob 35 on an extension 12b of one of the dasher shafts. It is preferred to associate the finger knob with the dasher in this construction on account of the relatively greater ease provided by the reduction gear to launch the rotor into synchronism with the magnetic vibratory pulls of the pole pieces. The synchronous motor unit is also preferably provided with a cover 36 so that the rotor construction may be covered if desired.

In the embodiment shown in Figs. 2 and 3 the electro-magnet I is illustrated as being supported by the inside wall of the face plate F, and under these conditions it will be preferable to make the face plate of non-magnetic material, such, for example, as brass or aluminum, so as to eliminate any tendency of the face plate by its proximity to reduce the efficiency of the electro-magnet by becoming energized by the magnetic flux induced in the core of the electro-magnet. This is desirable for the well known reason that if the face plate were made of magnetic iron, it would have a tendency to reduce the effectiveness of the magnetic flux deliverable to the rotor through the pole pieces 20b.

It will, of course, be understood that the present invention contemplates that all parts of the ice cream freezer, except the fixed core of the electro-magnet, the core extensions or pole pieces attached to the freezer, and the rotor, shall be constructed of non-magnetic metal or material, so as to preserve the full efficiency of the synchronous motor operating units.

Also it will be apparent that it is within the scope of the invention to make the electro-magnet I the face plate of the evaporator if desired. In that event the face plate would still assume the shape and characteristics of the electro-magnet, particularly in respect of the fixed beveled pole pieces of the electro-magnet. This is illustrated in Fig. 7.

Referring to Fig. 7, it will be observed that the electro-magnet Ia, which constitutes the face plate of the evaporator, is provided with the spaced legs or pole pieces 2a and 3a whose inner edges are continuously beveled as at 5a, the said beveled edges lying adjacent opposite sides of the freezing compartments of the evaporator. The electro-magnet Ia is provided with the coil 6a and a switch device 9a for controlling the current to the coil. The electro-magnet Ia may be supported in any suitable manner on the evaporator, as for example by means of the straps 38 which engage over the front pipes or coils and may be fastened to the body of the electro-magnet by means of suitable screws or the like. The electrical conductor wires for the coil 6a are preferably housed in an insulated cable 39 carrying at the end thereof a connector plug 40 adapted to fit into a conventional outlet or tap built in the upper wall of the cooling compartment of the refrigerator cabinet. With this arrangement the freezing mixture container or ice cream freezer carrying the pole pieces 20 having their ends reversely beveled with respect to the bevel on the legs of the fixed portion of the electro-magnet, may be readily inserted in the freezing compartment of the evaporator until the beveled faces of the pole pieces 20 and 3a and 5a engage. Since the outwardly beveled faces 5a of the fixed pole pieces 3a and 2a extend continuously throughout the range of the receptacle openings, it will be apparent that any one of the standard ice pans may be readily removed and the ice cream freezing container, with the rotor 14 and pole pieces 20 thereon, substituted for the ice pan which has been so removed. The lower end portions of the legs or pole pieces 2a and 3a may be provided with a non-magnetic metal skirt or curtain wall 41 for the purpose of concealing the coils of the evaporator.

It will be observed that the present invention contemplates the provision in substantially fixed relation to the evaporator A of a bi-polar electromagnet I, the salient poles 2 and 3 of which are so disposed as to project from pole to pole a field of magnetic flux at the ice pan receptacle. If the electro-magnet I is energized by alternating current with the ice cream freezer 10 and its associated pole pieces 20 or 20b and rotor 14 or 33 removed from such receptacle, the pulsating magnetic flux will proceed from pole to pole of the electro-magnet across a path of substantially maximum reluctance. The path for the magnetic flux under this condition is an air path or its equivalent and therefore a path of maximum reluctance to the extension of the magnetic flux, inasmuch as all parts of the evaporator under the proposed construction are of non-magnetic metal or material, and it is well known that non-magnetic metals or materials offer the same reluctance to electro-magnetism as air. Thus it will be apparent that when the ice cream freezer 10 is inserted in the receptacle at the evaporator A, with the pole pieces 20 or 20b and rotor 14 or 33 of magnetic metal disposed between the poles 2 and 3 of the electro-magnet, the reluctance of the path to the extension of the magnetic flux from pole to pole will be reduced, and it is the essence of this invention to utilize this principle of reducing the reluctance to the path of the magnetic flux from pole to pole of the electro-magnet to lead the pulsating magnetic flux to an effective location to operate by a magnetic rotor of a synchronous motor agitating and stirring means in a liquid container when such container is inserted in the receptacle of the evaporator.

While in the illustration shown only one ice cream freezing pan is set forth as used in substitution for one of the standard ice pans, nevertheless it will be understood that more than one ice cream freezer may be used, and it is contemplated that the magnetic effect resulting from the use of 110 volt, 60-cycle, alternating current in the coil 6 shall be sufficient to supply the power necessary to operate a plurality of synchronous rotors simultaneously, and this invention, of course, contemplates the use of a coil as coil 6 of the proper electrical characteristics to produce this result.

From the foregoing, it will be apparent that the present invention contemplates the provision of an electro-magnet located adjacent the front end of the evaporator in such a position that pole pieces carried by the ice cream freezer may contact therewith to supply the required vibratory magnetic energy to the rotor of the synchronous motor. The synchronous motor unit is either permanently or detachably connected to the front of the pan, and likewise the dasher construction may be built in the pan or made detachable, all of which is within the scope of the present invention. The distinctive feature, however, is the provision of simple and practical means associated with a freezing pan adapted to be interchangeably used with an ice cube freezing pan, so that by the mere act of placing the ice cream freezer in the freezing compartment of the evaporator and turning on the current to the coil of the electro-magnet, the freezer will become immediately operative upon the launching of the motor. In the latter connection it will, of course, be understood that a synchronous motor of the self-starting type may be used. Synchronous motors of the type herein disclosed are well known in the patented and practical art, and therefore it is deemed unnecessary to enter into a detailed discussion of these motors.

I claim:—

1. An ice cream freezer including a freezing pan, dasher means therein, and a synchronous motor for operating said dasher means, said synchronous motor including an electro-magnet comprising a relatively fixed part and a detachable part carried by the pan, the rotor of the motor also being carried by the pan.

2. In a refrigerator having an evaporator provided with a plurality of ice pan receiving compartments, the combination of an ice cream freezing pan adapted to be inserted in any one of said compartments, an electro-magnet located adjacent one end of said evaporator, dasher means for the ice cream freezing pan, and a rotor unit carried by the ice cream freezing pan and operatively connected with the dasher means, and pole pieces carried by the ice cream freezing pan adapted to form extensions of the electro-magnet for operating the rotor when the ice cream freezing pan is placed in a freezing compartment of the evaporator.

3. In a refrigerator, an evaporator having ice pan receiving compartments, the combination of an ice cream freezer having dasher means and adapted to be interchangeably used with the ice pans in any of said compartments, and synchronous motor means for operating the dasher means of the ice cream freezer, said synchronous motor means comprising a relatively fixed electro-magnet part and another electro-magnet part carried by the ice cream freezing pan, the part carried by the pan comprising pole pieces adapted to detachably engage with the pole pieces of the fixed electro-magnet, and a rotor having friction and inertia means for assisting in maintaining the rotor in synchronism with the pulsations of magnetic flux induced in the magnet by alternating current.

4. In a refrigerator, an evaporator, an ice cream freezer adapted for use interchangeably with the ice pans of the evaporator and comprising a synchronous motor including an electro-magnet located adjacent one end of the evaporator, and a freezing mixture container carrying therewith a rotor and pole pieces for said rotor, said pole pieces for the rotor being adapted to engage with the electro-magnet to produce a varying magnetic flux across said pole pieces to operate the rotor.

5. In a refrigerator, an evaporator, an ice cream freezer adapted for use interchangeably with the ice pans of the evaporator and comprising a synchronous motor including an electro-magnet having its pole pieces extending into the zone of the freezing compartments of the evaporator, and an insertible and removable freezing mixture container having pole pieces associated therewith adapted to contact with the first mentioned pole pieces, a rotor arranged between said pole pieces carried by the freezing mixture container, and dasher means connected to said rotor.

6. In a refrigerator, an evaporator, an ice cream freezing container adapted for use interchangeably with the ice pans of the evaporator and comprising dasher means in said container, a synchronous motor for operating said dasher means, said synchronous motor including an electro-magnet having spaced pole pieces mounted in a relatively fixed location with respect to the evaporator, pole pieces carried by the freezing container, and a rotor between said pole pieces adapted to be driven from a commercial source of alternating current, and an inertia element frictionally connected to said rotor and movable relative thereto, and said rotor being operatively connected with the dasher means.

7. In a refrigerator, an evaporator, an ice cream freezing container adapted for use interchangeably with the freezing pans of the evaporator and comprising dasher means in said container, and a synchronous motor including a rotor and pole pieces mounted on the container, said rotor being operatively connected with the dasher means, and an electro-magnet having pole pieces adapted to contact with the pole pieces carried by the freezing container whereby when the electro-magnet is energized the pole pieces on the freezing container and the pole pieces of the electro-magnet will be electro-magnetically locked together to hold the freezing container in the evaporator.

8. In a refrigerator, an evaporator, an ice cream freezing container adapted for use interchangeably with the freezing pans of the evaporator and comprising dasher means in said container, and a synchronous motor including pole pieces carried by the freezing container and movable therewith, a rotor between said pole pieces operatively connected with the dasher means, and an electro-magnet including a coil and spaced legs constituting pole pieces, the last mentioned pole pieces and the pole pieces on the freezing container having complemental contacting faces to insure a magnetic lock between the pole pieces, and a switch for controlling the current to said coil.

9. In a refrigerator, an evaporator, an ice cream freezer comprising a container adapted for use interchangeably with the freezing pans of the evaporator and comprising dasher means in said container, a face plate for the evaporator unit, and a synchronous motor including a rotor operatively connected with the dasher means and pole pieces for the rotor, said rotor and pole pieces both being carried by the container, and an electro-magnet carried by the face plate and including spaced pole pieces adapted to engage with the pole pieces on the container whereby when the electro-magnet is energized the rotor will be operated from a source of commercial alternating current.

10. In a mechanical refrigerator having an evaporator provided with freezing pan compartments, an ice cream freezer including a container adapted to be interchangeably fitted into said compartments with any of the ice pans, dasher means in the container, and a synchronous motor for operating the dasher means, said synchronous motor comprising an electro-magnet in the form of a plate constituting the face plate for the evaporator and comprising pole pieces located in the path of movement of the container when inserted in a freezing compartment of the evaporator, a rotor carried by the container and operatively connected with the dasher means, and pole pieces carried by the container having their inner ends operatively related to the rotor and their outer ends adapted for engagement with the pole pieces of the electro-magnet.

11. In a mechanical refrigerator, an evaporator unit having freezing pan compartments, an ice cream freezer including a container adapted to be inserted in any one of said compartments and having dasher means therein and a synchronous motor for operating said dasher means, said synchronous motor comprising an electro-magnet in the form of a plate having spaced leg portions constituting fixed pole pieces, said plate forming the face plate for the evaporator, a coil for the electro-magnet having a flexible electrical conductor connection provided with a socket tap, a socket in the refrigerator for detachably receiving said tap, a switch for controlling current to said coil, a rotor carried by the container and pole pieces at each side of the rotor having their outer ends adapted to contact with the fixed pole pieces of the electro-magnet.

12. In a refrigerator, an evaporator having a receptacle for a liquid container, a liquid container, agitating and stirring means therein, means on the evaporator for projecting at the receptacle a field of magnetic flux across a path substantially coextensive with one dimension of the receptacle, and means on the container insertible in said path to operate the said agitating and stirring means.

13. An ice cream freezer including a container adapted to be interchangeably used with a standard ice pan of a household refrigerator, dasher means in the container, and means for operating said dasher means comprising a synchronous motor including an electro-magnet having separable pole pieces respectively carried by a part of the refrigerator and the container.

14. In a refrigerator, the combination with the evaporator having ice pan receiving compartments, of a container interchangeable with the pans which are insertible in and removable from said compartments, dasher means in the container, and means for operating the dasher means comprising an electro-magnet supported by a part of the refrigerator, and a rotor carried by the container operated by said electro-magnet.

15. An ice cream freezer comprising a cold producing element and a container element one of which is movable relative to the other, dasher means for the container, and dasher operating means including an electro-magnet supported in a relatively fixed position with reference to one of said elements and a rotor carried by the other of said elements, said container when placed in the cold producing element causing the rotor to be placed in the field of the electro-magnet.

16. In a refrigerator, an evaporator, an ice cream container adapted for use interchangeably with the ice pans of the evaporator, dasher means in the container, and means for driving said dasher means including an electro-magnet having spaced pole pieces positioned adjacent the evaporator, pole pieces and a rotor carried by the container, said last mentioned pole pieces when placed in the field of said spaced pole pieces being adapted to transmit energy to the rotor.

17. An ice cream freezer including a container adapted to be interchangeably used with an ice pan of a household refrigerator, dasher means in the container, and a synchronous motor including an electro-magnet and a rotor respectively carried by a part of the refrigerator and the container.

18. In a refrigerator, the combination with the cooling unit having pan receiving compartments, of a container interchangeable with the pans of said receiving compartments, dasher means in the container, and means for operating the dasher means including an electro-magnet supported by the refrigerator and a rotor carried by the container, said rotor adapted to be placed in the field of the electro-magnet.

19. In a refrigerator, an evaporator having freezing compartments, an ice cream freezer adapted to be used interchangeably with any of the ice forming receptacles positioned in the evaporator compartments without obstructing access to other compartments, said ice cream freezer including a freezing receptacle, an agitator, and an electro-magnetically operated actuator for the agitator carried by one end of the freezing receptacle and lying within planes defining the upper and lower limits of said freezing receptacle.

20. In a refrigerator, an evaporator having freezing compartments, an ice cream freezer adapted to be used interchangeably with any of the ice forming receptacles positioned in the evaporator compartments without obstructing access to other compartments, said ice cream freezer including a freezing receptacle, an agitator, an electro-magnetically operator rotor for operating said agitator carried by one end of the receptacle and lying within planes defining the upper and lower limits of said freezing receptacle, and means for launching said rotor.

CHARLES THOMAS HOFFMAN.